(12) United States Patent
Lei et al.

(10) Patent No.: US 11,960,125 B2
(45) Date of Patent: Apr. 16, 2024

(54) OPTICAL FIBER ADAPTER

(71) Applicant: SUNCALL TECHNOLOGIES (SZ) CO., LTD, Shenzhen (CN)

(72) Inventors: Xuewu Lei, Shenzhen (CN); Xiaohui Liu, Shenzhen (CN); Masaya Nakagawa, Shenzhen (CN)

(73) Assignee: SUNCALL TECHNOLOGIES (SZ) CO., LTD, Shenzhen (CN)

( * ) Notice: Subject to any disclaimer, the term of this patent is extended or adjusted under 35 U.S.C. 154(b) by 318 days.

(21) Appl. No.: 17/278,224

(22) PCT Filed: Sep. 18, 2019

(86) PCT No.: PCT/CN2019/106329
§ 371 (c)(1),
(2) Date: Mar. 19, 2021

(87) PCT Pub. No.: WO2020/057528
PCT Pub. Date: Mar. 26, 2020

(65) Prior Publication Data
US 2021/0349268 A1    Nov. 11, 2021

(30) Foreign Application Priority Data
Sep. 21, 2018 (CN) .......................... 201811109738.6

(51) Int. Cl.
*G02B 6/38* (2006.01)
(52) U.S. Cl.
CPC ......... *G02B 6/3825* (2013.01); *G02B 6/3847* (2013.01)
(58) Field of Classification Search
CPC ....................................................... G02B 6/38
(Continued)

(56) References Cited

U.S. PATENT DOCUMENTS 5,687,268 A * 11/1997 Stephenson .......... G02B 6/3849
385/73
6,079,881 A * 6/2000 Roth .................... G02B 6/3869
385/139
(Continued)

FOREIGN PATENT DOCUMENTS

CN   2613769 Y   4/2004
CN   2665727 Y   12/2004
(Continued)

OTHER PUBLICATIONS

International Search Report for Application No. PCT/CN2019/106329 dated Nov. 1, 2019.

*Primary Examiner* — Kaveh C Kianni
(74) *Attorney, Agent, or Firm* — Suiter Swantz IP

(57) ABSTRACT

Provided is an optical fiber adapter. The optical fiber adapter includes a first adapter body, a shielding gate elastically hinged to a lower end portion of the first adapter body, and a second adapter body whose a lower end portion is inserted into a cavity of the first adapter body. An end surface of the lower end portion of the second adapter body extends downward to form extension posts and an engagement arm, the extension posts are pressed against two ends of a hinge shaft of the shielding gate, and the engagement arm is exposed outside the shielding gate and is engaged with an optical fiber connector joint inserted into a lower end portion of the first adapter body. This structural design can facilitate the installation and fixation of the shielding gate, and thus a better light-shielding and dust-proof effect can be achieved.

19 Claims, 3 Drawing Sheets

(58) Field of Classification Search
USPC .......................................................... 385/134
See application file for complete search history.

(56) References Cited

U.S. PATENT DOCUMENTS

| | | | | |
|---|---|---|---|---|
| 10,502,903 B1* | 12/2019 | Wang | .................... | G02B 6/3893 |
| 2003/0002808 A1* | 1/2003 | Lampert | .............. | G02B 6/3895 |
| | | | | 385/70 |
| 2003/0147597 A1* | 8/2003 | Duran | ................... | G02B 6/3825 |
| | | | | 385/76 |
| 2003/0169975 A1* | 9/2003 | Anderson | ............ | G02B 6/3825 |
| | | | | 385/76 |
| 2003/0180005 A1* | 9/2003 | McBride | .............. | G02B 6/3825 |
| | | | | 385/73 |
| 2004/0223701 A1* | 11/2004 | Tanaka | ................. | G02B 6/3897 |
| | | | | 385/55 |
| 2010/0054665 A1* | 3/2010 | Jones | ................... | G02B 6/3825 |
| | | | | 385/94 |
| 2012/0033918 A1* | 2/2012 | Jibiki | ................... | G02B 6/3849 |
| | | | | 385/75 |
| 2012/0195555 A1* | 8/2012 | Jibiki | ................... | G02B 6/3849 |
| | | | | 385/75 |
| 2013/0195405 A1 | 8/2013 | Sanders et al. | | |

FOREIGN PATENT DOCUMENTS

| | | | | |
|---|---|---|---|---|
| CN | 201892764 U | | 7/2011 | |
| CN | 207336841 U | | 5/2018 | |
| CN | 108508540 A | * | 9/2018 | ........... G02B 6/3825 |
| CN | 108919430 A | | 11/2018 | |
| CN | 208833957 U | | 5/2019 | |

\* cited by examiner

OPTICAL FIBER ADAPTER

CROSS-REFERENCE TO RELATED APPLICATION

This application is a U.S. National Stage Application of PCT Application Serial No. PCT/CN2019/106329, filed Sep. 18, 2019, which claims priority to Chinese Patent Application No. 201811109738.6 filed Sep. 21, 2018, the disclosures of which are incorporated herein by reference in their entireties.

TECHNICAL FIELD

The present disclosure relates to the technical field of connectors, for example, an optical fiber adapter.

BACKGROUND

In the related art, an optical fiber adapter used to be fitted with an optical fiber connector joint is usually arranged in one piece. Moreover, a dust cap is usually provided at a port of the optical fiber adapter, so as to prevent high-intensity infrared light beams through the port from accidentally hurting human eyes when the optical fiber connector joint is inserted into one end of the optical fiber adapter opposite to the port. However, in this way of designing, the dust cap may be easily lost and the plugging and unplugging of the dust cap may bring a lot of trouble.

SUMMARY

The present disclosure uses the solutions described below.

Provided is an optical fiber adapter, including a first adapter body, a second adapter body, and at least one shielding gate.

A lower end portion of the second adapter body is inserted into a cavity of the first adapter body from an upper end portion of the first adapter body, and an end surface of the lower end portion of the second adapter body extends downward to form multiple extension posts and at least one engagement arm.

The at least one shielding gate is elastically hinged to a lower end portion of the first adapter body through a hinge shaft.

After the second adapter body is inserted into the cavity of the first adapter body, each of the multiple extension posts is configured to be pressed against a respective one of two ends of the hinge shaft of the at least one shielding gate, the at least one engagement arm is configured to be exposed outside the at least one shielding gate, and the at least one engagement arm is configured to be engaged with an optical fiber connector joint inserted into the lower end portion of the first adapter body.

DETAILED DESCRIPTION

Figure 1:
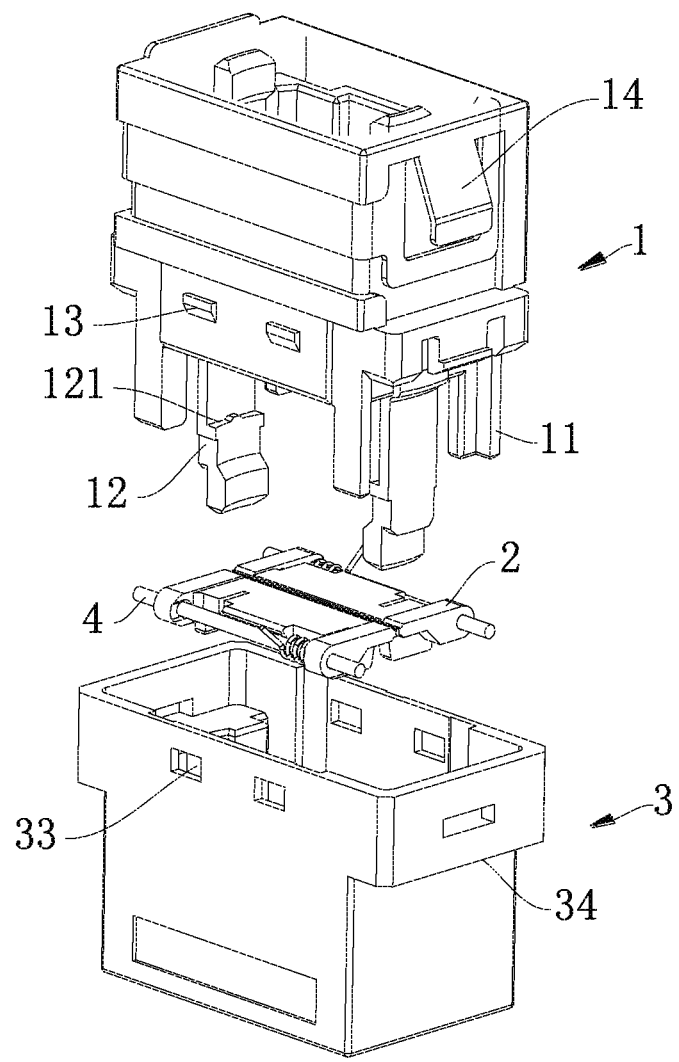
FIG. 1 is an exploded view of an optical fiber adapter according to an embodiment of the present disclosure.

The solutions of the present disclosure are described hereinafter through embodiments in conjunction with drawings.

An embodiment provides an optical fiber adapter. The optical fiber adapter includes a first adapter body 3, a second adapter body 1, and at least one shielding gate 2. A lower end portion of the second adapter body 1 is inserted into a cavity of the first adapter body 3 from an upper end portion of the first adapter body 3, and an end surface of the lower end portion of the second adapter body 1 extends downward to form multiple extension posts 11 and at least one engagement arm 12. The at least one shielding gate 2 is elastically hinged to a lower end portion of the first adapter body 3 through a hinge shaft 4. After the second adapter body 1 is inserted into the cavity of the first adapter body 3, each of the multiple extension posts 11 is pressed against a respective one of two ends of the hinge shaft 4 of the at least one shielding gate 2, the at least one engagement arm 12 is exposed outside the at least one shielding gate 2 at the lower end portion of the first adapter body 3, and the at least one engagement arm 12 is engaged with an optical fiber connector joint inserted into the lower end portion of the first adapter body 3.

As shown in FIGS. 1 to 4, this embodiment provides an optical fiber adapter. The optical fiber adapter includes a first adapter body 3, a shielding gate 2 elastically hinged to a lower end portion of the first adapter body 3, and a second adapter body 1 whose a lower end portion is inserted into a cavity of the first adapter body 3. An end surface of a lower end portion of the second adapter body 1 extends downward to form extension posts 11 and an engagement arm 12. The extension posts 11 are pressed against two ends of a hinge shaft 4 of the shielding gate 2, respectively. The engagement arm 12 is exposed outside the shielding gate 2 and is engaged with an optical fiber connector joint inserted into the lower end portion of the first adapter body 3.

In this embodiment, multiple long grooves 31 are provided on two opposite inner side walls of the cavity of the first adapter body 3 and along a depth direction of the cavity of the first adapter body 3. Each of end portions of the hinge shaft 4 of the at least one shielding gate 2 is accommodated in a bottom of a respective one of the multiple long grooves 31, and each of multiple extension posts 11 is inserted into a respective one of the multiple long grooves 31 and abuts against a respective one of end portions of the hinge shaft 4. To facilitate the cooperation of the long grooves 31 and the end portions of the hinge shaft 4, a bottom of each long groove 31 is U-shaped.

In this embodiment, to press the end portions of the hinge shaft 4 more stably and reliably, a cross section of each extension post 11 is L-shaped. After the extension post 11 is inserted into the long groove 31, the extension post 11 can be stably and reliably fitted with the long groove 31, and then firmly press the hinge shaft 4.

In this embodiment, four extension posts 11 are evenly distributed on four corners of the end surface of the lower end portion of the second adapter body 1. Two shielding gates 2 are elastically hinged to the lower end portion of the first adapter body 3, each shielding gate 2 is elastically hinged to the lower end portion of the first adapter body 3 through one hinge shaft 4, and each of end portions of hinge shafts 4 of the two shielding gates 2 is accommodated in a bottom of a respective long groove 31 among four long grooves 31. Each of the four extension posts 11 is inserted into a bottom of a respective long groove 31, and every two of the four extension posts 11 are pressed against two ends of a corresponding hinge shaft 4, respectively.

In this embodiment, in the preceding installation method, each shielding gate 2 is elastically hinged to a respective one of two inner side walls of the lower end portion of the first adapter body 3, and one side wall 22 of each shielding gate 2 facing away from a hinge shaft 4 of the each shielding gate 2 is provided with a rounded corner, and one side wall 22 of one of two shielding gates 2 facing away from a hinge shaft 4 of the one of the two shielding gates 2 overlaps with one side wall 22 of another one of the two shielding gates 2 facing away from a hinge shaft 4 of the another one of the two shielding gates 22. With this structural design, the two shielding gates can be fully closed so that light leakage can be avoided.

Figure 2:
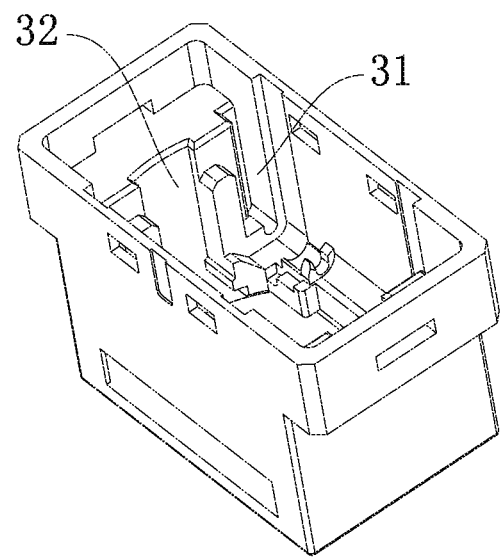
FIG. 2 is an axonometric drawing of the first adapter body of FIG. 1.
Figure 3:
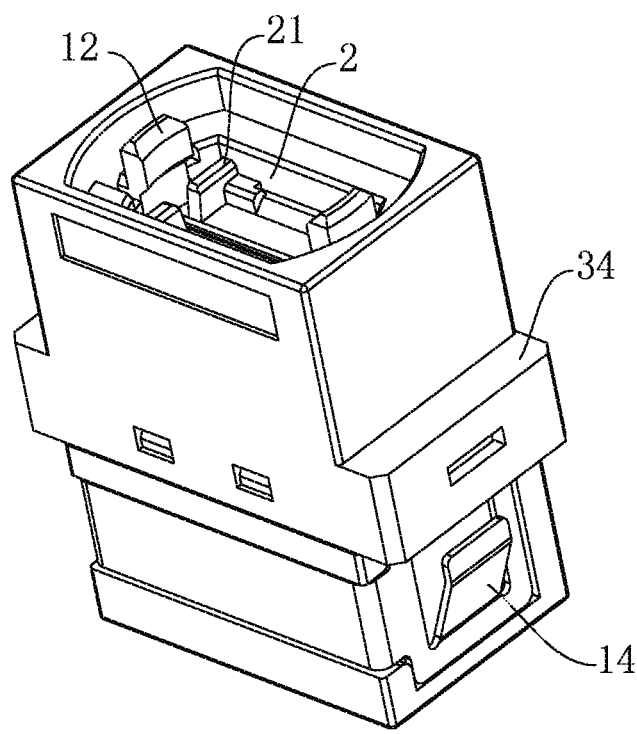
FIG. 3 is an axonometric drawing of a lower end portion of the first adapter body of FIG. 1.
Figure 4:
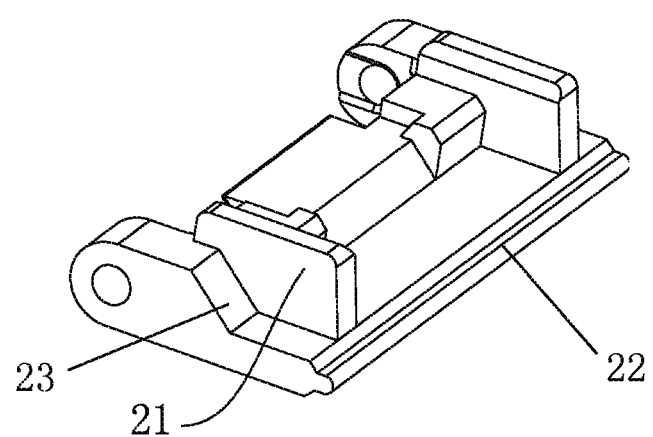
FIG. 4 is an axonometric drawing of a shielding gate of FIG. 1.

Furthermore, to increase the strength of the connection between the first adapter body 3 and the second adapter body 1 and to facilitate the installation and fixation of the optical fiber connector joint, as shown in FIG. 2, slots 32 are provided throughout middle portions of the two opposite inner side walls of the cavity of the first adapter body 1 and along a depth direction of the cavity, the two opposite inner side walls are located at two ends of the shielding gate 2, and each of two engagement arms 12 is inserted into a respective slot 32 and lower ends of the two engagement arms 12 are exposed outside lower bottom surfaces of the shielding gate 2, respectively.

An outer side wall of an upper end portion of the first adapter body 3 is circumferentially provided with multiple engagement positions 33, multiple hooks 13 are circumferentially provided on and protruded from an outer side wall of the lower end portion of the second adapter body 1, and each engagement position 33 is engaged with a respective hook 13.

Further, in this embodiment, one side of the lower bottom surface of the shielding gate 2 adjacent to the engagement arm 12 protrudes to form a guiding protrusion 21, so as to enable two shielding gates 2 to be smoothly opened during the insertion process of the optical fiber connector joint and play a better guiding role for the optical fiber connector joint, and the guiding protrusion 21 is fitted with the optical fiber connector joint.

In this embodiment, the inner side wall of each engagement arm 12 is provided with a boss 121 and an end portion 23 of each of two ends of each shielding gate 2 is laid on a respective boss 121, so as to prevent light leakage caused by the gap between the engagement arm 12 and the shielding gate 2 after the engagement arm 12 is exposed outside the lower bottom surface of the shielding gate 2. Therefore, before the optical fiber connector joint is inserted, a cavity avoiding light leakage is formed on an optical fiber access side above the shielding gates 2 through the cooperation between the two overlapping shielding gates 2 and the engagement arms 12. In this manner, the following case can be effectively avoided: when an optical fiber is inserted into an upper end portion of the second adapter body 1, the light is emitted from the lower end portion of the first adapter body 3. Therefore, a better light-shielding and dust-proof effect can be achieved.

In this embodiment, each of the opposite two outer side walls of the upper end portion of the first adapter body 3 extends outward to form a positioning boss 34, and each of the opposite two outer side walls of the upper end portion of the second adapter body 1 is provided with a positioning elastic piece 14. With this structure, the optical fiber adapter can be conveniently engaged with a mounting wall of a mounting body, that is, the mounting wall is sleeved on the upper end portion of the second adapter body 1 and engaged between the positioning boss 34 and the positioning elastic piece 14.

In the optical fiber adapter designed by adopting the preceding solution, through the mutual cooperation between a first adapter body 3 and a second adapter body 1, two shielding gates 2 may be elastically hinged to a cavity at a lower end portion of the first adapter body 3, which facilitates the installation and fixation of the shielding gates 2. Moreover, through the cooperation between the two shielding gates 2 and two engagement arms 12, a cavity avoiding light leakage may be formed on an optical fiber access side above the two shielding gates 2 before the two shielding gates 2 are opened. In this manner, the following case can be effectively avoided: when an optical fiber is inserted into an upper end portion of the second adapter body 1, the light is emitted from the lower end portion of the first adapter body 3. Therefore, a better light-shielding and dust-proof effect can be achieved.

What is claimed is:

1. An optical fiber adapter, comprising:
   a first adapter body;
   a second adapter body, wherein a lower end portion of the second adapter body is inserted into a cavity of the first adapter body from an upper end portion of the first adapter body, and an end surface of the lower end portion of the second adapter body extends downward to form a plurality of extension posts and at least one engagement arm; and
   at least one shielding gate elastically hinged to a lower end portion of the first adapter body through a hinge shaft,
   wherein after the second adapter body is inserted into the cavity of the first adapter body, each of the plurality of extension posts is configured to be pressed against a respective one of two ends of the hinge shaft of the at least one shielding gate, the at least one engagement arm is configured to be exposed outside the at least one shielding gate, and the at least one engagement arm is configured to be engaged with an optical fiber connector joint inserted into the lower end portion of the first adapter body; and
   wherein a plurality of long grooves are provided on two opposite inner side walls of the cavity of the first adapter body and along a depth direction of the cavity of the first adapter body, each of end portions of the hinge shaft of the at least one shielding gate is accommodated in a bottom of a respective one of the plurality of long grooves, and the each of the plurality of extension posts is inserted into a respective one of the plurality of long grooves and abuts against a respective one of the end portions of the hinge shaft.

2. The optical fiber adapter of claim 1, wherein the plurality of extension posts comprise four extension posts, the four extension posts are evenly distributed on four corners of the end surface of the lower end portion of the second adapter body, and a cross section of each of the four extension posts is L-shaped.

3. The optical fiber adapter of claim 2, wherein the at least one shielding gate comprises two shielding gates, and each of two opposite inner side walls of the lower end portion of the first adapter body is elastically hinged to a respective one of the two shielding gates, one side wall of each of the two shielding gates facing away from a hinge shaft of the each of the two shielding gates comprises a rounded corner, and one side wall of one of the two shielding gates facing away from a hinge shaft of the one of the two shielding gates overlaps with one side wall of another one of the two shielding gates facing away from a hinge shaft of the another one of the two shielding gates.

4. The optical fiber adapter of claim 3, wherein
the plurality of long grooves comprise four long grooves, each of end portions of hinge shafts of the two shielding gates is accommodated in a bottom of a respective one of the four long grooves, and the each of the four extension posts is inserted into a respective one of the four long grooves and abuts against a respective one of the end portions of the hinge shafts of the two shielding gates.

5. The optical fiber adapter of claim 3, wherein
the at least one engagement arm comprises two engagement arms; and
two slots are provided throughout middle portions of each of two opposite inner side walls of the cavity of the first adapter body and along a depth direction of the cavity, respectively, and each of the two engagement arms is inserted into a respective one of the two slots and lower ends of the two engagement arms are exposed outside lower bottom surfaces of the two shielding gates, respectively.

6. The optical fiber adapter of claim 5, wherein
an inner side wall of each of the at least one engagement arm comprises a boss, and an end portion of each of two ends of each of the at least one shielding gate is laid on a respective boss.

7. The optical fiber adapter of claim 1, wherein
an inner side wall of each of the at least one engagement arm comprises a boss, and an end portion of each of two ends of each of the at least one shielding gate is laid on a respective boss.

8. The optical fiber adapter of claim 1, wherein
one side of a lower bottom surface of the at least one shielding gate adjacent to the at least one engagement arm protrudes to form a guiding protrusion, and the guiding protrusion is fitted with the optical fiber connector joint.

9. The optical fiber adapter of claim 1, wherein
a plurality of engagement positions are circumferentially provided on an outer side wall of the upper end portion of the first adapter body, and a plurality of hooks are circumferentially provided on and protruded from an outer side wall of the lower end portion of the second adapter body, and each of the plurality of engagement positions is engaged with a respective one of the plurality of hooks.

10. The optical fiber adapter of claim 1, wherein
each of two opposite outer side walls of the upper end portion of the first adapter body extends outward to form a positioning boss.

11. The optical fiber adapter of claim 9, wherein
each of two opposite outer side walls of an upper end portion of the second adapter body comprises a positioning elastic piece.

12. The optical fiber adapter of claim 1, wherein
the plurality of extension posts comprise four extension posts, the four extension posts are evenly distributed on four corners of the end surface of the lower end portion of the second adapter body, and a cross section of each of the four extension posts is L-shaped.

13. The optical fiber adapter of claim 1, wherein
one side of a lower bottom surface of the at least one shielding gate adjacent to the at least one engagement arm protrudes to form a guiding protrusion, and the guiding protrusion is fitted with the optical fiber connector joint.

14. An optical fiber adapter, comprising:
a first adapter body;
a second adapter body, wherein a lower end portion of the second adapter body is inserted into a cavity of the first adapter body from an upper end portion of the first adapter body, and an end surface of the lower end portion of the second adapter body extends downward to form a plurality of extension posts and at least one engagement arm; and
at least one shielding gate elastically hinged to a lower end portion of the first adapter body through a hinge shaft,
wherein after the second adapter body is inserted into the cavity of the first adapter body, each of the plurality of extension posts is configured to be pressed against a respective one of two ends of the hinge shaft of the at least one shielding gate, the at least one engagement arm is configured to be exposed outside the at least one shielding gate, and the at least one engagement arm is configured to be engaged with an optical fiber connector joint inserted into the lower end portion of the first adapter body; and
wherein an inner side wall of each of the at least one engagement arm comprises a boss, and an end portion of each of two ends of each of the at least one shielding gate is laid on a respective boss.

15. The optical fiber adapter of claim 14, wherein
the at least one shielding gate comprises two shielding gates, and each of two opposite inner side walls of the lower end portion of the first adapter body is elastically hinged to a respective one of the two shielding gates, one side wall of each of the two shielding gates facing away from a hinge shaft of the each of the two shielding gates comprises a rounded corner, and one side wall of one of the two shielding gates facing away from a hinge shaft of the one of the two shielding gates overlaps with one side wall of another one of the two shielding gates facing away from a hinge shaft of the another one of the two shielding gates.

16. The optical fiber adapter of claim 15, wherein
the at least one engagement arm comprises two engagement arms; and
two slots are provided throughout middle portions of each of two opposite inner side walls of the cavity of the first adapter body and along a depth direction of the cavity, respectively, and each of the two engagement arms is inserted into a respective one of the two slots and lower ends of the two engagement arms are exposed outside lower bottom surfaces of the two shielding gates, respectively.

17. An optical fiber adapter, comprising:
a first adapter body;
a second adapter body, wherein a lower end portion of the second adapter body is inserted into a cavity of the first adapter body from an upper end portion of the first adapter body, and an end surface of the lower end portion of the second adapter body extends downward to form a plurality of extension posts and at least one engagement arm; and
at least one shielding gate elastically hinged to a lower end portion of the first adapter body through a hinge shaft,
wherein after the second adapter body is inserted into the cavity of the first adapter body, each of the plurality of extension posts is configured to be pressed against a respective one of two ends of the hinge shaft of the at least one shielding gate, the at least one engagement arm is configured to be exposed outside the at least one shielding gate, and the at least one engagement arm is configured to be engaged with an optical fiber connector joint inserted into the lower end portion of the first adapter body; and wherein a plurality of engagement positions are circumferentially provided on an outer side wall of the upper end portion of the first adapter body, and a plurality of hooks are circumferentially provided on and protruded from an outer side wall of the lower end portion of the second adapter body, and each of the plurality of engagement positions is engaged with a respective one of the plurality of hooks.

18. The optical fiber adapter of claim 17, wherein an inner side wall of each of the at least one engagement arm comprises a boss, and an end portion of each of two ends of each of the at least one shielding gate is laid on a respective boss.

19. The optical fiber adapter of claim 17, wherein one side of a lower bottom surface of the at least one shielding gate adjacent to the at least one engagement arm protrudes to form a guiding protrusion, and the guiding protrusion is fitted with the optical fiber connector joint.

* * * * *